United States Patent [19]

Moore

[11] 4,337,558

[45] Jul. 6, 1982

[54] TUBE END FINISHING DEVICE

[76] Inventor: James D. Moore, 1550 "C" W. 139 St., Gardena, Calif. 90249

[21] Appl. No.: 140,245

[22] Filed: Apr. 14, 1980

[51] Int. Cl.³ .................... B23C 3/02; B23B 51/16
[52] U.S. Cl. .................... 29/33 T; 408/11; 408/10; 409/186; 409/187
[58] Field of Search ............ 29/33 T; 409/184, 185, 409/138, 186, 187; 408/219, 223, 10, 11, 12, 13

[56] References Cited

U.S. PATENT DOCUMENTS

| | | | |
|---|---|---|---|
| 1,977,341 | 10/1934 | Mackintosh | 409/187 |
| 2,353,284 | 7/1944 | Barrett | 409/185 X |
| 2,873,630 | 2/1959 | Eschenburg et al. | 408/10 |
| 2,932,192 | 4/1960 | Hansen | 408/10 |
| 3,103,140 | 9/1963 | Connelly | 409/185 X |
| 3,186,012 | 6/1965 | Brown | 408/10 |
| 3,259,023 | 7/1966 | Rieger et al. | 408/11 X |
| 3,286,594 | 11/1966 | Kruse, Jr. | 409/187 X |
| 3,487,730 | 1/1970 | Dohring et al. | 408/10 |
| 3,552,238 | 1/1971 | Quackenbush | 408/10 |
| 3,732,758 | 5/1973 | Rinaldo | 409/185 X |

FOREIGN PATENT DOCUMENTS 52-13187  2/1977  Japan .................... 409/186

Primary Examiner—William R. Briggs
Attorney, Agent, or Firm—Joseph Shulsinger

[57] ABSTRACT

A device for production rate finishing and deburring of the ends of lengths of pipe with minimum loss of time, utilizing the finishing tool as a sensor to control the feed rate, whereby the end finishing and deburring is accomplished in a single pass and the tools are driven to the workpiece at a high feed rate.

7 Claims, 2 Drawing Figures

TUBE END FINISHING DEVICE

BACKGROUND OF THE INVENTION

1. Field of the Invention

This invention relates generally to machinery devices and more particularly to devices for machining the open ends of lengths of pipe.

2. Description of the Prior Art

In the production of pipe, as lengths of pipe are produced it is necessary to finish surface and deburr both ends of each length of pipe. In modern, high-volume production operations this requirement often becomes the pacing item in attempting to achieve higher production rates. The finish surfacing and deburring typically consists of first machining the end surface to be flat, smooth and perpendicular to the longitudinal axis of the pipe, then removing the burrs from the inner and outer edges. It is relatively simple and quick to precisely locate the pipe radially for this finishing operation using V-shaped clamps or similar locating, clamping means. However, precisely locating the pipe end laterally along its axis is much more difficult and time consuming. Moreover, the length of the pipe may vary considerably. As a result, most pipe finishing operations only locate the pipe nominally in the longitudinal direction. Existing double end, tube end finishing machines can not compensate for variations in pipe lengths of 1/16 inch or greater.

The tools typically used for the finish surfacing, deburring and beveling are standard machine tool cutters and grinders. Such tools are subject to fracture under impact shocks and operate most efficiently at a relatively slow drive speed. Consequently, a typical pipe end finishing operation consists of driving the tools under fast feed until they are almost at a position to contact the workpiece, if the workpiece is located at the innermost limit of the positioning tolerance. The drive is then shifted to slow feed until the tools actually contact the workpiece and throughout the machining operation. Of course, if the workpiece is located at the outermost limit of the positioning tolerance, the tools have to traverse the entire width of the positioning tolerance at slow feed which represents a considerable waste of time. A proportionate waste of time occurs for all intermediate longitudinal positions of the workpiece.

Other methods utilize multiple passes requiring more complex and costly machinery and usually requiring comparable time or longer. For example, the end finishing tool may be brought to the end of the pipe in an operation similar to that described above and, after the pipe end is faced, the deburring tools radially displaced to contact the workpiece (see U.S. Pat. Nos. 3,280,672; 3,796,116; and 2,030,562). Alternatively, a turret lathe using a live spindle and multiple tools mounted on a driven turret (see U.S. Pat. No. 4,058,033) may be employed. Although these other methods require complex and costly machine tools, they do not solve the basic problem.

SUMMARY OF THE INVENTION

The instant invention enables the entire process of finishing the ends of the lengths of pipe to be accomplished more rapidly by providing at each end of the workpiece (length of pipe to be finished) one rotating tool head capable of being driven transversely toward the workpiece, with all the end finishing and deburring-/beveling tools mounted thereon, slidably mounting the end facing tool in the rotating tool head in a manner allowing the end facing tool to slidably retract into the rotating tool head in response to lateral pressure from contact with the workpiece, while maintaining pressure on the workpiece, sensing the magnitude of lateral retraction of the end facing tool into the tool head, and controlling the rate of lateral drive by the sensed magnitude of retraction.

The rotating tool head is driven at fast feed toward the workpiece until the end facing tool contacts the workpiece. The rotating end facing tool immediately begins surfacing the end of the workpiece and, at the same time, retracting into the tool head. Spring means urge the end facing tool outward against the workpiece maintaining the end facing tool against the workpiece with sufficient pressure to continue the machining operation. As soon as the end facing tool starts retracting into the tool head, the relative movement is sensed and used to change the drive to slow feed. The rotating tool head continues to be driven laterally toward the workpiece at slow feed as the end facing operation is completed, the inner and outer bevel tools are brought into contact with the workpiece, and the inner and outer edges of the open end of the workpiece are deburred and beveled. When sufficient lateral retraction of the end facing tool into the tool head has been sensed to indicate that the desired deburring and beveling has been accomplished, the drive is reversed, returning the rotating tool head to its initial position. The removal of contact between the workpiece and the end facing tool removes the pressure from the end facing tool and the spring means urges the end facing tool to its initial maximally extended position.

Thus all measurements are made relative to the actual position of the end of the workpiece. The drive feed rate is only slowed when the cutting tools are located proximately to the workpiece, regardless of the lateral position of the workpiece, since the signals for slowing the drive feed rate are generated by contact with the end of the workpiece. Consequently, no time is wasted in slow feed due to uncertainty in the positioning of the end of the workpiece.

The shock of the end facing tool contacting the stationary end of the workpiece while being driven in fast feed is mitigated by the shock absorbing effect of the end facing tool being forced into the tool head against the spring pressure.

DETAILED DESCRIPTION

Figures 1, 2:
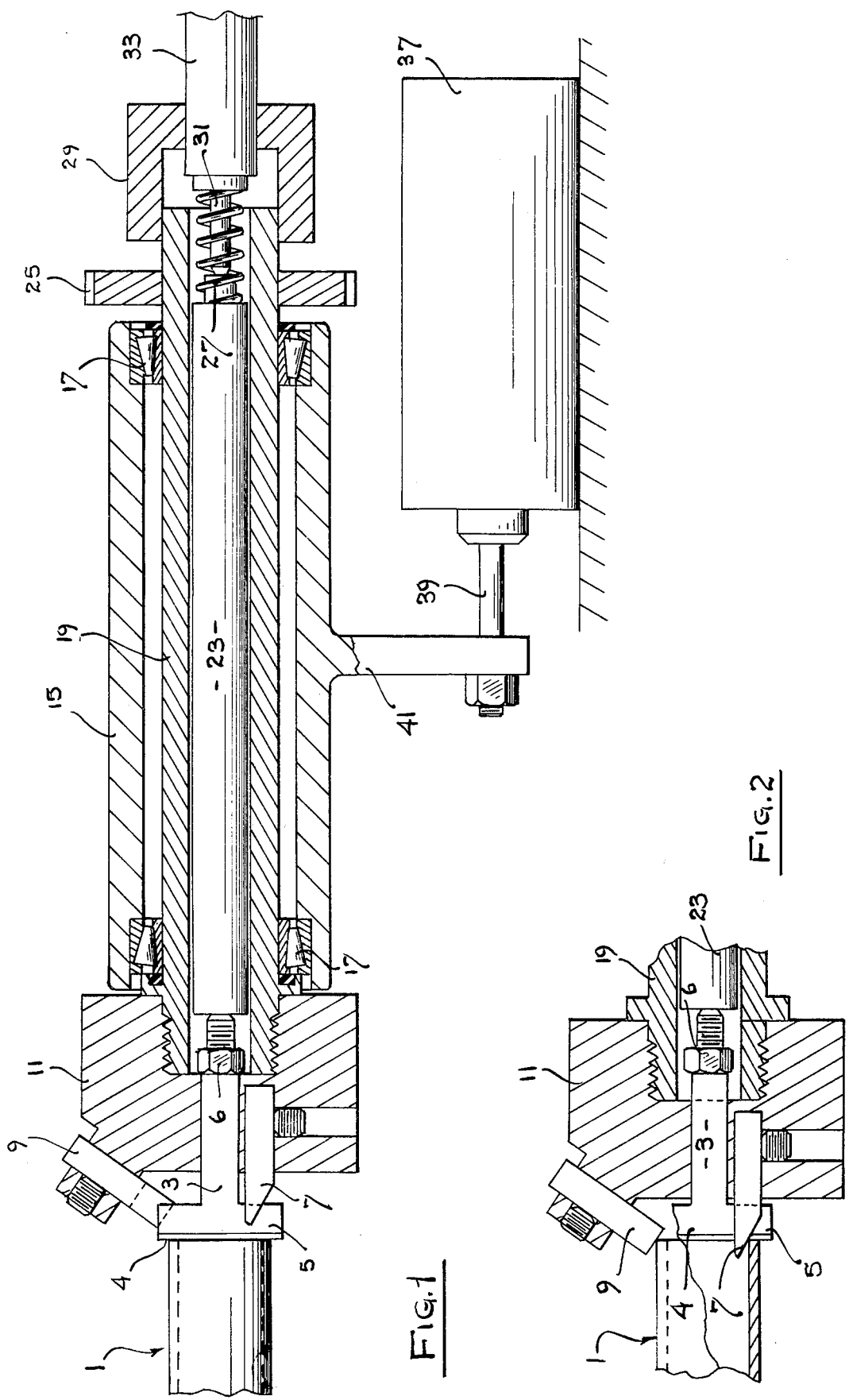
FIG. 1 is a sectional view of the invention showing the relative positions of the members when the end facing tool initially contacts the workpiece.
FIG. 2 is a partial sectional view of the invention showing the T-shaped facing tool partially retracted.

The workpiece (1) is fixedly mounted with the end to be surfaced and deburred facing the tool head (11). Fixedly mounted in the tool head (11) are an inside bevel tool (7) and an outside bevel tool (9). Slidably mounted in the tool head (11) is a T-shaped facing tool (5). The centerline of the shank (3) of T-shaped facing tool (5) is aligned substantially coincident with the rotational axis of the tool head (11). Hollow spindle shaft (19) is removably connected to tool head (11). Hollow spindle shaft (19) is rotatably mounted within a quill (15) utilizing roller bearings (17) such that the hollow spindle shaft (19) is free to rotate around its centerline independent of the quill (15), but is constrained to follow lateral movements of the quill (15).

At the end of the hollow spindle shaft (19) distal the tool head (11) a hydraulic feed control (33) is mounted by means of an adapter (29). The hydraulic feed control (33) may be any of a number of commercially available feed controls containing a shaft whereby the command from the feed control is selectably responsive to the degree of shaft extension from the speed control.

A push rod (23) is movably placed within the hollow spindle shaft (19) between the T-shaped facing tool shank (3) and the hydraulic feed control shaft (31). A compression spring (27) is mounted between the push rod (23) and the hydraulic feed control (33) so as to urge the push rod (23) toward the tool head (11). A stop nut (6), adjustably mounted on the T-shaped facing tool shaft (3), determines the maximum outward travel of the T-shaped facing tool (5).

The hollow spindle shaft (19) is driven through the spindle rotating drive (25) by motor means (not part of the instant invention). The quill (15) is driven laterally along the rotational axis of the hollow spindle shaft (19) by a feed cylinder (37), through a feed cylinder shaft (39) which is fixedly connected to the quill (15) through a feed drive bracket (41).

The hydraulic feed control is set to cause the feed cylinder (37) to provide fast feed toward the workpiece (1) when the hydraulic feed control shaft (31) is allowed its maximum extension. However, a slight retraction of feed control shaft (31) into the hydraulic feed control (33) causes the feed cylinder (37) to provide slow feed in the same direction. A predetermined amount of further retraction of the feed control shaft (31) into the hydraulic feed control (33) causes the feed cylinder (37) to reverse the feed direction causing feed cylinder shaft (39) to return to its original position. Alternatively, a time delay may be provided to cause the feed cylinder (37) to reverse the feed direction a predetermined time after initiation of slow feed.

FIG. 1 shows the invention as the T-shaped facing tool (5) is first contacting the end of the workpiece (1). A facing plate (4), which may be a carbide or diamond grinding surface or a carbide cutting tool or the like, is mounted on the T-shaped facing tool surface nearest the workpiece (1). During the entire operation the tool head (11) and the hollow spindle shaft (19) are rotating at the proper speed for machining the end of the workpiece. As soon as the facing plate (4) contacts the workpiece (1), the facing plate starts squaring off the end surface of the workpiece (1). At the same time the pressure of the workpiece (1) on the face plate (4) is transmitted to the T-shaped facing tool (5) causing it to slide inward with respect to the tool head (11). This causes the T-shaped facing tool shank (3) to press against the push rod (23) causing it to move laterally with respect to the hollow spindle shaft (19) which in turn forces the hydraulic feed control shaft (31) to retract into the hydraulic feed control (33). The retraction of the hydraulic feed control shaft (31) causes the feed cylinder (37) to provide slow feed. Under slow feed the facing operation continues as the inside bevel tool (7) and the outside bevel tool (9) move into contact with the workpiece (1), as shown in FIG. 2, beveling the inner and outer edges of the end face and removing any burrs. After the predetermined amount of bevel is achieved, the T-shaped facing tool (5) will have moved inward with respect to the tool head (11) sufficiently (or a sufficient time from initiation of slow speed will have transpired) to have caused the hydraulic feed control shaft (31) to have retracted into the hydraulic feed control (33) the amount required to cause the feed cylinder to reverse the feed direction. This causes the quill (15) to be moved back to its original position which allows the T-shaped facing tool (5) to disengage the workpiece (1) and slide outward with respect to the tool head to the limit allowed by the stop nut (6) contacting the tool head (11).

The workpiece (1) may then be released and removed. Another workpiece may be substituted and the entire cycle repeated. Thus it may be seen that the present invention allows the tools to travel to the workpiece using a fast feed without requiring precise location of the end of the workpiece laterally with respect to the finishing device, and yet protecting the deburring tools from being fed too rapidly into contact with the workpiece.

Artisans skilled in machinery operations and machine tools will recognize that many variations of the details of implementing the finishing device are possible all within the general scope of this invention defined by the following claims.

I claim:

1. A method of finishing and deburring the open end faces of lengths of pipe without requiring precise lengthwise location of each length of pipe, and with minimum loss of time driving the finishing tools to the length of pipe, comprising:

in a rotating tool head capable of being laterally driven in either direction along its axis of rotation, fixedly mounting an inside bevel tool and an outside bevel tool, and slidably mounting a T-shaped facing tool, clamping a length of pipe with the open end to be finished and deburred facing said tool head, fast feeding said tool head toward said length of pipe until said T-shaped facing tool contacts the end of said length of pipe, allowing said T-shaped facing tool to slide inwardly in said tool head while maintaining sufficient pressure against said length of pipe to machine the end surface of said length of pipe, sensing the magnitude of inward sliding of said T-shaped facing tool relative to said tool head, when said T-shaped facing tool has moved a sufficient amount with respect to said tool head such that said inside bevel tool and said outside bevel tool are a predetermined finite small distance from said open end face of said length of pipe, automatically changing the drive of said tool head to a slow feed compatible with the proper cutting rate of said bevel tools, when said T-shaped facing tool has moved a sufficient amount with respect to said tool head such that proper beveling and deburring of the inner and outer edges of said open end face of said length of pipe has been accomplished, automatically reversing the drive direction until said tool head has returned to its initial position, and automatically urging said T-shaped facing tool outwardly to its initial position with respect to said tool head.

2. In a machine for finishing and deburring the end face of an open end of a length of pipe, a work piece activated device for controlling the rate of drive of the tools located at at least one end of said length of pipe comprising:

laterally traversable rotating tool mounting means, deburring and beveling tools replaceably rigidly mounted on said rotating tool mounting means, an end finishing tool laterally slidably mounted on said rotating tool mounting means, means sensing the relative lateral movement between said end finishing tool and said rotating tool mounting means, lateral drive control means regulating the rate of lateral drive of said rotating tool mounting means responsive to the lateral movement between said end finishing tool and said rotating tool mounting means.

3. The workpiece activated device of claim 2 wherein said laterally traversable rotating tool mounting means comprises:

a quill laterally traversable toward and away from said open end of a length of pipe, and tool mounting means rotatingly mounted within said quill constrained to move laterally with said quill.

4. The device of claim 3 wherein said tool mounting means comprises:

a motor driven hollow spindle shaft, and a tool head removably attached to said hollow spindle shaft comprising:

means replaceably rigidly mounting a cutting tool to engage the inside edge of said open of a length of pipe as said quill is traversed toward said open end of a length of pipe, means replaceably rigidly mounting a cutting tool to engage the outside edge of said open end of a length of pipe as said quill is traversed toward said open end of a length of pipe, a cylindrical aperture through said tool head, of non-circular cross-section, co-axial with the rotational axis of said tool head.

5. The workpiece activated device of claim 2 wherein said end finishing tool laterally slidably mounted on said rotating tool mounting means comprises:

a T-shaped facing tool comprising:

a shank shaped to fit slidably through a cylindrical aperture of non-circular cross-section such that rotation of said cylindrical aperture imparts rotation to said shank about its longitudinal axis, a cross member perpendicularly affixed to said shank at one end thereof, and a facing plate, capable of grinding or cutting pipe, replaceably attached to the surface of said cross member distal said shank.

6. The workpiece activated device of claim 2 wherein said means sensing the relative lateral movement between said end finishing tool and said rotating tool mounting means and said lateral drive control means regulating the rate of lateral drive of said rotating tool mounting means comprise:

a body, a depressable rod extending outwardly from said body coaxially with the rotational axis of said laterally traversable rotating means, settable sensing and signalling means commanding said drive means to provide maximum forward drive when said depressable rod is maximally extended, to provide slow drive when said depressable rod has been depressed a predetermined amount, and to provide maximum reverse drive when said depressable rod has been depressed a further predetermined amount, spring means urging said depressable rod toward the maximally extended position, and compression means overcoming said spring means and causing said depressable rod to be depressed into said body as a predetermined magnitude of lateral pressure is applied to said end finishing tool.

7. The workpiece activated device of claim 2 wherein said means sensing the relative lateral movement between said end finishing tool and said rotating tool mounting means and said lateral drive control means regulating the rate of lateral drive of said rotating tool mounting means comprise:

a body, a depressable rod extending outwardly from said body, coaxially with the rotational axis of said laterally traversable rotating means, settable sensing and signalling means commanding said drive means to provide maximum forward drive when said depressable rod is maximally extended, and to provide slow forward drive when said depressable rod has been depressed a predetermined amount, settable time delay means commanding said drive means to provide maximum reverse drive a predetermined time after initiation of slow forward drive, spring means urging said depressable rod toward the maximally extended position, and compression means overcoming said spring means and causing said depressable rod to be depressed into said body as a predetermined magnitude of lateral pressure is applied to said end finishing tool.

* * * * *